United States Patent
Oettinger et al.

(10) Patent No.: US 7,920,213 B2
(45) Date of Patent: Apr. 5, 2011

(54) METHOD FOR MAINTAINING THE PHASE DIFFERENCE OF A POSITIONING MIRROR AS A CONSTANT WITH RESPECT TO A HIGH SPEED RESONANT MIRROR TO GENERATE HIGH QUALITY IMAGES

(75) Inventors: Eric Gregory Oettinger, Rochester, MN (US); James Eugene Noxon, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 1287 days.

(21) Appl. No.: 11/493,143

(22) Filed: Jul. 26, 2006

(65) Prior Publication Data

US 2008/0031102 A1 Feb. 7, 2008

(51) Int. Cl.
*H04N 5/66* (2006.01)
*H04N 3/14* (2006.01)

(52) U.S. Cl. ........ 348/739; 348/792; 348/785; 348/781; 348/782; 348/536; 359/201.2; 359/213.1; 347/235

(58) Field of Classification Search .................. 348/739, 348/781, 792, 785, 782, 779, 756, 536; 359/213.1, 359/214.1, 201.1, 201.2; 347/235, 237, 250; 358/474; 345/204

See application file for complete search history.

(56) References Cited

U.S. PATENT DOCUMENTS

| 6,285,383 | B1 | 9/2001 | Klement et al. |
| 6,956,597 | B2 | 10/2005 | Bush et al. |
| 7,190,329 | B2 * | 3/2007 | Lewis et al. ........................ 345/7 |
| 7,239,436 | B2 * | 7/2007 | Oettinger et al. ........... 359/213.1 |
| 7,262,894 | B2 * | 8/2007 | Oettinger et al. ........... 359/213.1 |
| 7,599,011 | B2 * | 10/2009 | Oettinger et al. ............. 348/739 |

FOREIGN PATENT DOCUMENTS

WO 01/33283 A1 5/2001

* cited by examiner

*Primary Examiner* — Jeffrey Harold
*Assistant Examiner* — Jean W Désir
(74) *Attorney, Agent, or Firm* — William B. Kempler; Wade J. Brady, III; Frederick J. Telecky, Jr.

(57) ABSTRACT

System and method for synchronizing the low speed mirror movement of a mirror display system with incoming frame or video signals, and synchronizing buffered lines of video data to the independently oscillating scanning mirror. According to one embodiment of the invention, the peak portions of the low speed cyclic drive signal are synchronized with the incoming frames of video by compressing or expanding the peak portion or turn around portion so that each video frame begins at the same location on the display screen. The actual position of the high frequency mirror is determined by sensors and a "trigger" signal is generated to distribute the signals for each scan line such that the scan lines are properly positioned on the display.

23 Claims, 7 Drawing Sheets

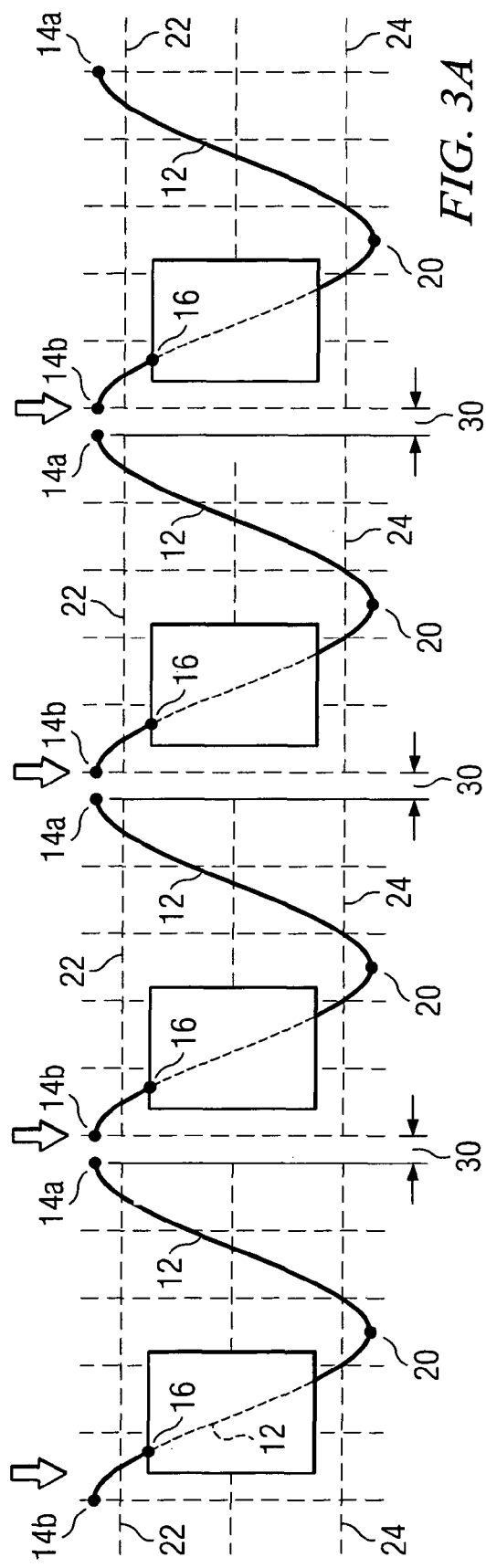
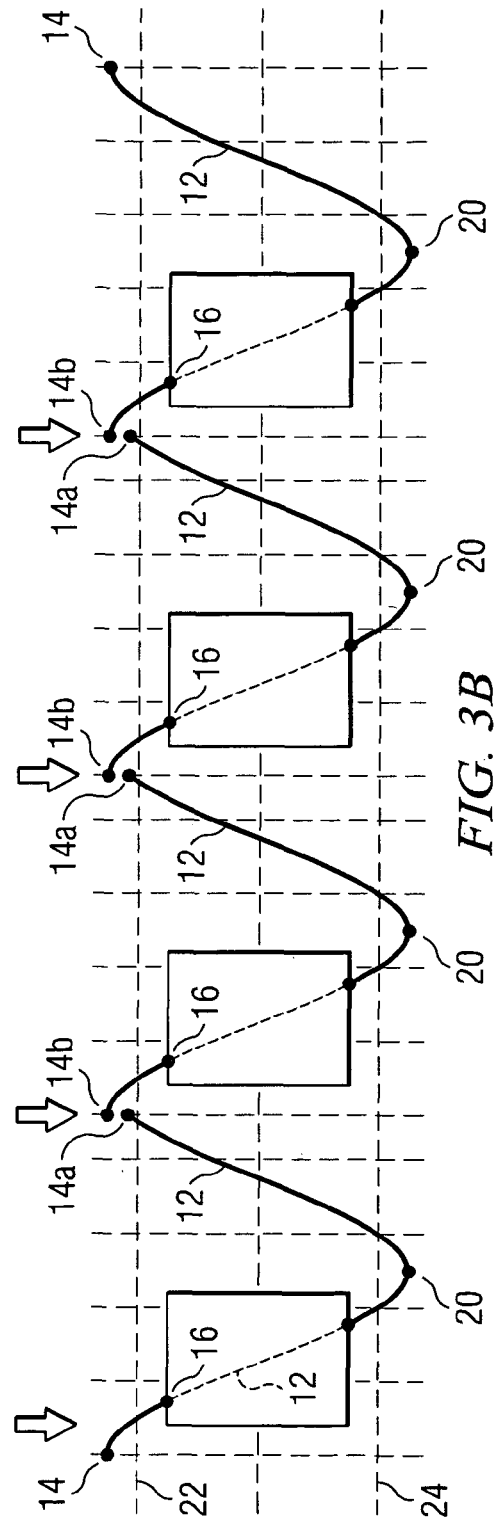
FIG. 3A
FIG. 3B

METHOD FOR MAINTAINING THE PHASE DIFFERENCE OF A POSITIONING MIRROR AS A CONSTANT WITH RESPECT TO A HIGH SPEED RESONANT MIRROR TO GENERATE HIGH QUALITY IMAGES

TECHNICAL FIELD

The present invention relates to a video display comprising a high speed scanning mirror and a decoupled slow speed positioning mirror that moves orthogonally to the high speed mirror for generating scan or image lines to produce an image. The invention further relates to synchronizing the orthogonally moving low frequency mirror with the incoming video signals. More particularly, the invention relates to adjusting and maintaining the phase difference between the low frequency mirror and the sweep of the high speed scanning mirror that displays the first image line as a selected constant.

BACKGROUND

In recent years torsional hinged high frequency mirrors (and especially resonant high frequency mirrors) have made significant inroads as a replacement for spinning polygon mirrors as the drive engine for laser printers. These torsional hinged high speed resonant mirrors are less expensive and require less energy or drive power than the earlier polygon mirrors.

As a result of the observed advantages of using the torsional hinged mirrors in high speed printers, interest has developed concerning the possibility of also using a similar mirror system for video displays that are generated by scan lines on a display surface.

Standard CRT (cathode ray tube) video systems for displaying such scan-line signals use a low frequency positioning circuit, which synchronizes the display frame rate with an incoming video signal, and a high frequency drive circuit, which generates the individual image lines (scan lines) of the video. In the prior art systems, the high speed circuit operates at a frequency that is an exact even multiple of the frequency of the low speed drive signal and this relationship simplifies the task of synchronization. Therefore, it would appear that a very simple corresponding torsional hinged mirror system would use a high speed torsional hinged scanning mirror to generate scan lines and a slower torsional hinged mirror to provide the orthogonal motion necessary to position or space the scan lines and thereby produce a raster "scan" similar to the raster scan of the electron beam of a CRT. Unfortunately, the problem is more complex than that. The scanning oscillations of a high speed resonant scanning mirror cannot simply be selected to have a frequency that is an exact even multiple of the positioning motion of the low frequency mirror.

More specifically, the orthogonal positioning motion and, consequently, the low frequency mirror drive signal must be tied to the incoming image frame rate of the video signals to avoid noticeable jumps or jitter in the display. At the same time, however, the high frequency mirror must run or oscillate at substantially its resonant frequency, since driving a high-Q mirror at a frequency only slightly different than the resonant frequency will result in a significant decrease in the amplitude of the beam sweep (i.e. reduce the beam envelope). This would cause a significant and unacceptable compression of the image on the display. Therefore, the high speed mirror drive is decoupled from the low speed mirror drive. That is, as mentioned above, the high speed drive signal cannot simply be selected to be an even multiple of the low speed drive signal.

However, in a video display, each frame of incoming video signals representing video pixels (such as might be received from a DVD player or a VCR player) must still be faithfully reproduced. This means, each pixel of each successive frame of video must be properly located on the screen of the display in both the vertical and horizontal directions if distortions are to be avoided. At the same time, however, and as described above in a torsional hinged mirror based video system, the low frequency mirror drive must still be synchronized to the flow rate of the incoming video signals, and the high speed mirror must oscillate at its resonant frequency. Therefore, since the resonant frequency of the high speed mirror may vary from unit to unit because of manufacturing variables or with environmental condition, the high speed mirror must be decoupled from the low speed or orthogonal moving mirror. At the same time, the individual pixels of an image must be properly located in both the vertical and horizontal direction to assure high quality images.

Therefore, a mirror based video system that can meet these requirements would be advantageous.

SUMMARY OF THE INVENTION

These and other problems are generally solved or circumvented, and technical advantages are generally achieved by the embodiments of the present invention, which provides a method of preventing variations in the vertical positioning of the first scan line of an image frame.

More specifically, the method comprises the step of generating a cyclic drive signal (such as for example a sinusoidal or repetitive triangular drive signal) to position the low frequency mirror. The cyclic drive signal will include upper and lower peak portions (i.e. where the drive signal reverses the mirror direction), and display portions.

The phase difference between the movement of the sweep of the high speed resonant mirror that displays the first image line and the low speed positioning mirror is determined. The phase difference is then maintained at a constant value by increasing or decreasing a selected portion of the low speed drive signal. The amount of increase or decrease of the drive signal is selected to achieve two results. First, the amount is selected such that the mirror is synchronized to the incoming frame rate. It is then further adjusted so that the phase difference between the two mirrors is a constant at the point where the first scan line begins.

A display portion of the drive signal is sandwiched between a lower peak portion and an upper peak portion, and corresponds to the mirror positions where an image or partial image frame is generated in the display. The "frame" of video may comprise a complete image or a partial image. As an example, an image may be comprised of interlaced odd and even fields and a first frame may be the even fields and the second frame the odd fields such that the two frames are required for a complete image. Further, as will be appreciated by those skilled in the art, each of the odd and even fields may be divided in two parts such that four frames of the data are required for a complete image. It will also be appreciated, that each of the received frames of video signals may arrive at a fixed frequency or the frames may vary from a fixed frequency, as can occur in the case of a stretched VCR tape. The invention may also be used to synchronize the mirror to a desired precise waveform having a standard frequency, for example, of 59.92 Hz.

Therefore, according to another embodiment of the invention, the low speed positioning mirror is synchronized with the incoming data frame rate, by adjusting one of the peak or turn around portions of the cyclic drive signal by compressing or expanding so that each frame of video starts at the same position on the low frequency drive signal. To accomplish this, an "arming" signal is generated. The timing of the "arming" signal occurrence is calculated to occur at substantially the same location for each cycle of the low frequency positioning signal. However, it will also be appreciated that the data signals or pixels representing each scan line must also be distributed so that the first pixel of each scan line is always positioned at substantially the same horizontal location on the high speed beam sweep. Consequently, the data for each scan line is stored in a buffer so that the distribution of the data during a beam sweep can be synchronized with the scanning mirror. Synchronizing the incoming data signal with the slow speed mirror will typically be a coarse adjustment followed by vertical positioning of the first scan line as a fine adjustment.

According to another embodiment, the step of generating the low speed cyclic drive signal may comprise repetitive generation of a series of discrete values that in turn generate one cycle of the drive signal, and the step of adjusting the peak portions of the drive signal for both synchronizing with the incoming data signal and/or for precise positioning of the first scan lines comprises increasing and/or decreasing the number of discrete values and therefore the timing making up the peak portion that drives or positions the low frequency mirror. To synchronize the incoming data signals with the low speed mirror additional discrete values may expand the peak portion (i.e. increase the cycle time). Alternately, in some situations, the number of discrete values may be decreased to compress the peak portion (i.e. decrease cycle time) of the drive signal. Such increasing or decreasing the peak portion of the low frequency drive signals may be accomplished according to one embodiment of the invention by generating a multiplicity of discrete values that may be optionally selected or not selected as required for a specific cycle. All of the discrete values are stored in a circular buffer and this large number of discrete values include a "surplus" or number of discrete values that is in excess of the number required for a nominal cycle. The circular buffer creates the cyclic motion of the drive signal. The required time to complete the turn around or peak portion of the drive signal and start a new cycle that is synchronized with the incoming image signals may then be provided by positioning the restart or wrap around pointer to include the proper number of the multiplicity of discrete values.

According to yet another embodiment compressing or expanding a portion of the cyclic drive signal comprises modifying the sample time or clock-rate at which a selected number of the cyclic drive discrete samples are delivered.

According to the invention, movement of the low speed mirror to a selected position of the drive cycle "arms" the system for the display of each frame at a selected location(s) in its travel; and movement of the high speed resonant mirror to a selected position of each resonant cycle generates a "trigger" signal, which initiates the release of a data stream representing one complete scan line from a buffer. It should be appreciated that there may be hundreds of "trigger" points, which represent the hundreds of scan lines, for each "arming" point, which represents the start of an image frame or partial frame.

In one embodiment, the "arming" signal is based on sensors, which monitor the position of the low-speed mirror. Alternately, in another embodiment, the position is inferred or calculated based on the driving waveform, which will have a substantially constant phase lead relative to the actual position. This embodiment may allow the elimination of sensors resulting in lower system cost and complexity. However, due to the greater variations in the phase between the high speed mirror drive signal and the high speed mirror position, calculated values for the trigger signals may not be accurate, and therefore, a sensor will typically be required to generate the "trigger" signals.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 3A and 3B show how the cyclic low speed drive signal of FIG. 1A is stretched or compressed according to the teachings of the invention to properly synchronize the low speed mirror to the incoming video signal;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 6:
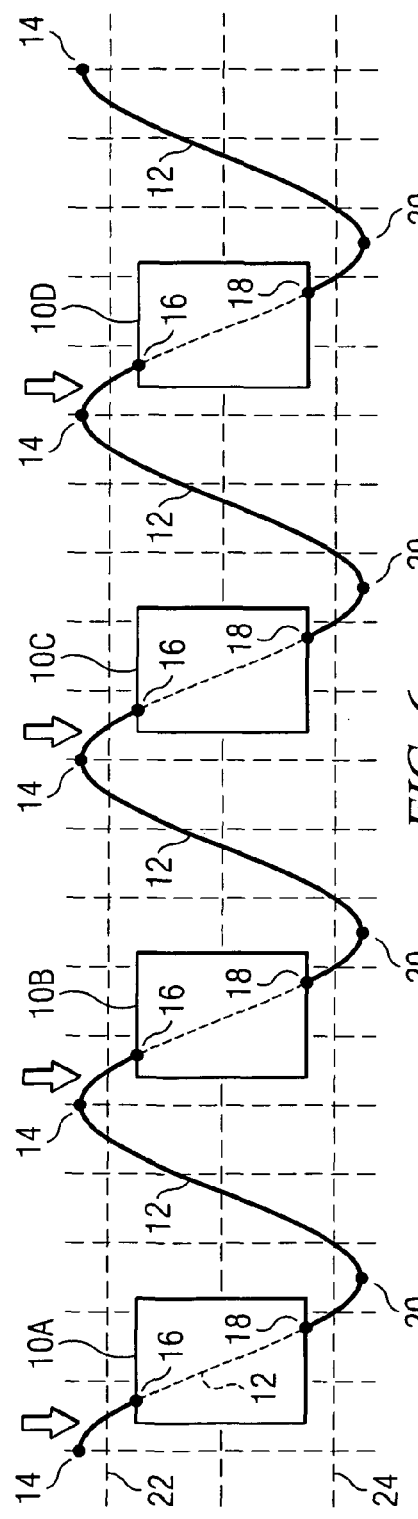
FIG. 6 is a prior art figure showing displays of high frequency video frames where the scan mirror operates at an exact even multiple of the low frequency positioning mirror.

Referring now to prior art FIG. 6, there is illustrated the interaction of a high speed horizontal scanning drive signal and a low speed (vertical) or scan line positioning signal used to control a prior art electronic display formed by a raster scan, such as for example a CRT display. The terms "horizontal", used with respect to scanning drive signals, and "vertical", used with respect to the beam positioning signals, are for convenience and explanation purposes only, and it will be appreciated by those skilled in the art that the scan lines could run vertically and the positioning signals could position the vertical scan lines horizontally across a display screen.

As shown in FIG. 6, four typical frames of video such as indicated by image boxes 10a, 10b, 10c, and 10d are generated during the same (substantially linear) portion of each cycle of the slow speed sinusoidal drive signal represented by curve 12. More specifically, if the slow speed positioning signal has a frequency of 60 Hz, then in the example of FIG. 6, sixty different frames of video (i.e. complete images), rather than the four as illustrated, will be generated in one second. Therefore, if as shown in the figure, the frequency of the high speed or scanning drive signal is an exact even multiple of the frequency of the low speed signal, then each successive video frame will start and be located at the same position on a CRT display screen. For example, if transition point 14 is at the exact peak of the drive signal, it represents both the end point of each cycle of the electron beam positioning slow speed drive signal and the start point of the next cycle of the drive signal. Therefore, the starting location of a frame of video shown as point 16 will be selected to always occur a certain time period after transition point 14 and can be selected to represent the start point (or placement of the first line) of each frame. Likewise point 18 will be the end point (or placement of the last line) of each frame. In the prior art CRT example of FIG. 6, the electron beam retraces or travels in a reverse direction between the lowest point 20 and peak point 14 of the low frequency cycle as the electron beam of the CRT is repositioned for the next frame of video signals. As discussed above, the portion of the low frequency drive signal between points 16 and 18 is substantially linear and is referred to hereinafter as the display portion, whereas the transition top peak point 14 and the lowest peak point 20 not only are not located during a linear portion of the signal, but as mentioned represent where the positioning drive signal actually stops and reverses the direction of the electron beam. These reverse or "turn-around" portions (above line 22 and below line 24) of the drive signal are referred to hereinafter as the upper and lower peak portions or transition points of the drive signal.

Figure 1A:
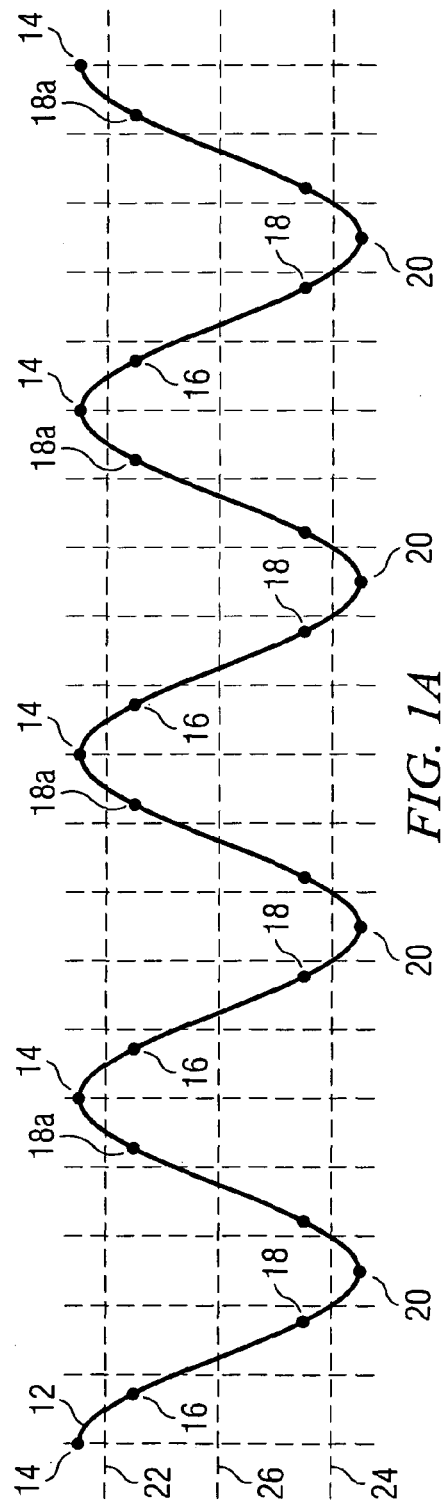
FIGS. 1A and 1B illustrate, respectively, low speed (scan line positioning) and high speed (resonant scanning) cyclic signals for driving the mirrors about their axis.
Figure 1B:
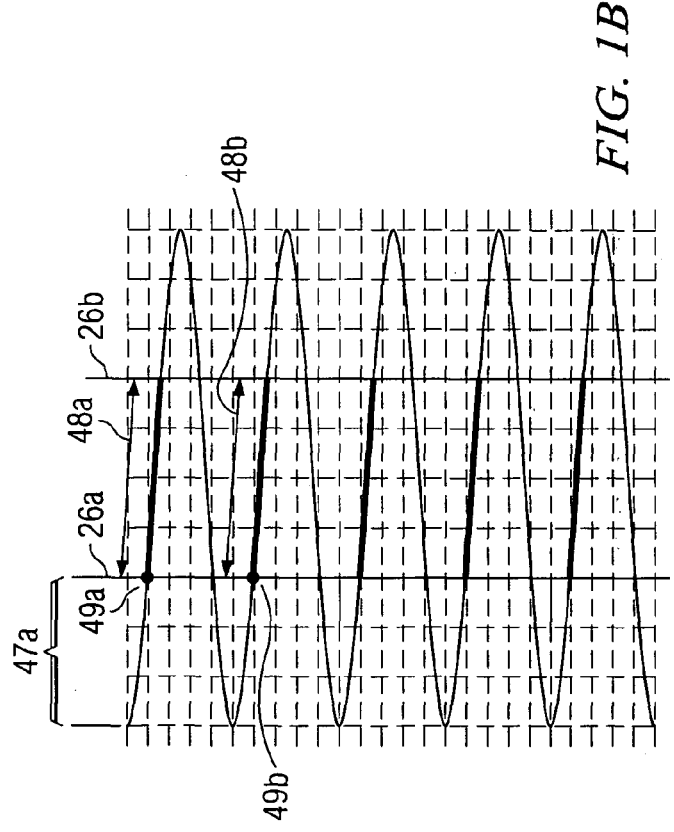
Figure 1C:
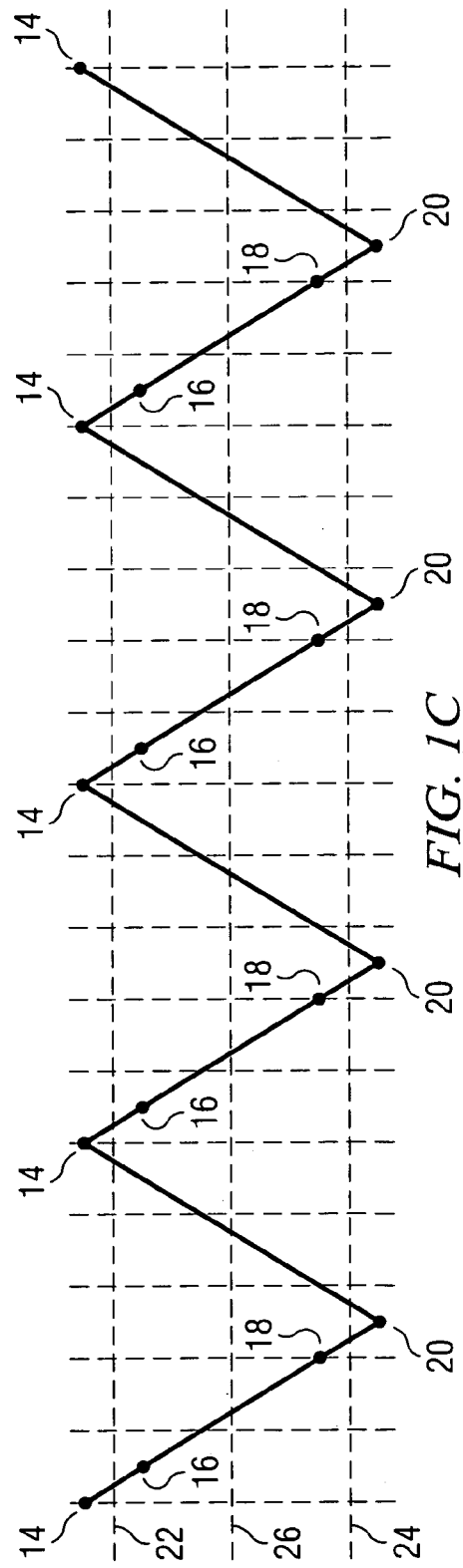
FIG. 1C is the same as FIG. 1A, except a triangular low speed drive signal is illustrated rather than a sinusoidal drive signal.

FIG. 1A is similar to FIG. 6 and represents the positioning or slow speed drive signal of a positioning mirror according to the present invention, but does not illustrate the frames of video. As an example only, the slow speed or positioning mirror may oscillate on the order of 60 CPS (cycles per second) or Hz in a manner similar to the slow speed electron beam drive signal discussed above with respect to prior art FIG. 6. FIG. 1B represents the scanning drive signal and/or the corresponding scanning position of a high speed resonant mirror according to the teachings of the present invention. However, it is not shown to scale with respect to FIG. 1A and, although possible, is not likely at all to be an exact even multiple frequency of the slow speed drive signal. For example, the resonant frequency of a scanning torsional hinged mirror, such as illustrated in FIG. 1B, may be on the order of 20 kHz, 30 kHz, or greater. FIG. 1C is similar to FIG. 1A, except as shown, the slow speed cyclic drive signal has a repetitive triangular shape rather than a sinusoidal shape. The portion of the curve above and below lines 22 and 24 respectively still represent the upper and lower peak (or turn-around) portions of the mirror movement, and the portion of the curve between lines 22 and 24 still represent the display portion of the signal and/or mirror movement where the video frame is generated.

Figure 2B:
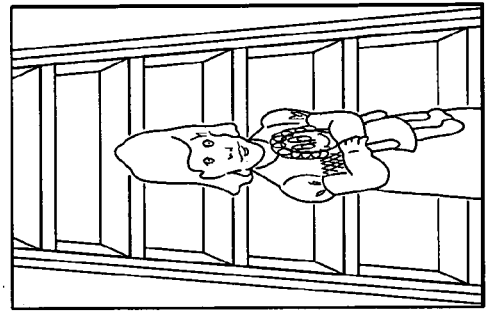
FIG. 2B illustrates an image frame similar to that of FIG. 2A, except the resonant mirror is operated off of resonance and at less than full sweep amplitude.
Figure 2A:
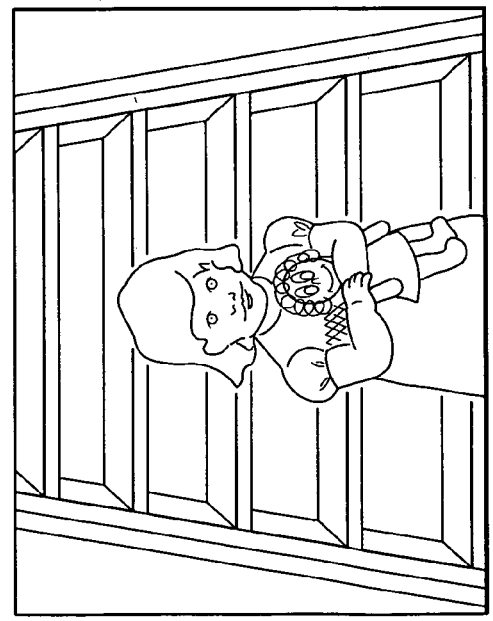
FIG. 2A illustrates an image frame generated by a torsional hinged mirror operating at resonant frequency and at full sweep amplitude.

Therefore, it will be appreciated that if the scanning speed of a torsional hinge resonant mirror as represented by the graph of FIG. 1B could simply be selected to be an exact even multiple of the speed of the slow speed positioning mirror, synchronization of a mirror display system could be accomplished in a manner similar to that for a raster scan electron beam display system as discussed above. Unfortunately, although resonant mirrors can be manufactured within reasonable tolerances, the actual resonant frequencies cannot be controlled so that the resonant speed of each mirror of a group of mirrors formed on a silicon wafer could be precisely manufactured as an exact even multiple of a speed selected for the slow speed mirror. Further, as was disclosed above, driving a high speed resonant mirror at a speed only slightly off of its resonant frequency can drastically reduce the sweep amplitude of the mirror, or alternately the mirror may require a significant increase in the energy required to drive the mirror so as to maintain an equivalent sweep amplitude. FIG. 2A illustrates a frame of video generated by a resonant mirror operating at resonance and at full amplitude. FIG. 2B illustrates the same frame of video where the resonant mirror is operating off of its resonant frequency with the resulting significantly reduced sweep amplitude.

Another problem that must be dealt with using a mirror driven system is that for some types of video storage media, a stream of data signals comprising adjacent frames of video may be non-periodic. That is, successive data frames are not always received with the same timing, and consequently, would not appear at the same location on the display without compensation. As an example, if the video storage media is a VCR tape, a portion of the tape may be stretched, and consequently, the frames of data will not be received with the same timing. That is, each frame of data is not received at a constant rate and, therefore, would not be precisely located at the same position on the display without some means of compensation. The present invention solves these various issues by allowing the high speed mirror to always run at its resonant frequency and asynchronously controlling or coupling the cyclic beam positioning signals that drive the slow speed or positioning mirror to each frame of the incoming video signals. The data or signals comprising an image frame typically include a timing signal (or sync or interrupt signal) that can be used to precisely determine the start or end of the next image frame. This allows the slow speed mirror to be synchronized with the incoming data signals so that the image frame may be properly positioned to start at the same point of the display portion during the slow speed mirror movement for each image frame. More specifically, an "arming" signal is generated at a selected location during the mirrors travel. This "arming" signal is synchronized with the interrupt or timing signal that is included with each frame of data.

To accomplish this, a sinusoidal (or repetitive triangular shape) slow speed cyclic drive signal may be generated wherein each point (y) of the drive signal can be expressed as a function of time (i.e. y=f(t)), where "t" represents discrete time values from 0, 1, 2, 3, . . . etc. to an end point "T" such that after the end point is reached, the cyclic drive signal returns to the "0" or exact peak start value, and continually repeats. Therefore, assuming a frame of incoming video data is received and stored (or buffered), and if the first line of each frame is to be synchronized or positioned so that it is provided at a particular point of the slow speed signal subsequent to the interrupt, then adjusting the end point "T" of the drive signal allows the start position of each data frame on a display to be precisely located whether the frequency of the incoming data varies or is fixed.

It is also important, of course, that the data representing each scan or image line be distributed so that the data (pixels) are properly displayed or located in both the horizontal and vertical directions on the display screen during the display portion of the sweep of the resonant mirror. More specifically, the first and last pixels of each line of an image must start and end at substantially the same horizontal location on the display for each sweep of the resonant mirror. In addition, the first line of an image frame or partial frame must be located at substantially the same vertical location for each display cycle. To accomplish starting (and consequently stopping) the scan line at the same horizontal location, the display system of this invention may include a sensing device or devices and the corresponding feedback circuitry to allow the actual position of the mirror to be determined at one or more selected points during each repeating cycle. Consequently, the position of the scanning mirror can be accurately calculated at any other point of time during the high speed beam sweep. Further, an accurate start and end point of an image line during a sweep of the high speed resonant mirror can also be determined. Consequently, a "trigger" signal that accurately initiates the release of data from a buffer or storage is generated for each scan or image line to assure that the image signals representing an image line are released from storage and displayed precisely between the start and end points. As mentioned, the timing of the "trigger" signal can be accurately calculated since the frequency of the scanning mirror is known as well as when the mirror is at one or more precise positions during a beam sweep. Thus, the signals representing each line of an image can be initiated or released from the buffer by the "trigger" signal. As will also be appreciated, there will be several hundred "trigger" signals for each "arming" signal and the corresponding image frame.

Referring to FIG. 3A, there is illustrated a condition where the incoming frame of data is received at a rate slightly slower than nominal. That is, the time between successive transition peak points "T" 14 is greater than nominal. Consequently, to assure proper vertical position or placement of the first scan line, a peak portion of the cyclic drive signal is delayed or expanded by a computed amount or time period as representative by the double arrow 30, extending between the end point 14a of a cycle and the exact peak or start point 14b of the next cycle. As shown, this additional time period 30 delays or "expands" the top peak portion of the drive signal, and consequently, the exact peak or start point 14b of the next cycle. Thus, the start point 16 of each data frame can be determined and positioned at substantially the same y-axis location on the display screen or media by referring to the following equations:

$$y(t) = A^* \cos(2^*n^*t/T) \text{ for } t=0 \text{ to } T; \text{ and} \qquad 1)$$

$$y(t) = y(T) \text{ for } t \leq T_{nom} \qquad 2)$$

where A=amplitude of drive signal and $T_{nom}$ is the nominal number of samples.

FIG. 3B illustrates the opposite condition, wherein successive transition points occur more rapidly than the transition point 14 of the nominal sinusoidal drive signal. Consequently, the peak portion of the positive signal is compressed or occurs earlier than nominal to assure that each image frame is properly placed. As shown, the positive peak portion of the drive signal is compressed by removing portions of the drive signal between the end point 14a and the exact peak or start point 14b. This effectively reduces the count "T" in the above discussed equations. Further depending on the resolution chosen for discrete time steps, this process may amount to adding or subtracting a single sample, i.e., "T" may be constant to within a single count.

Figure 4A:
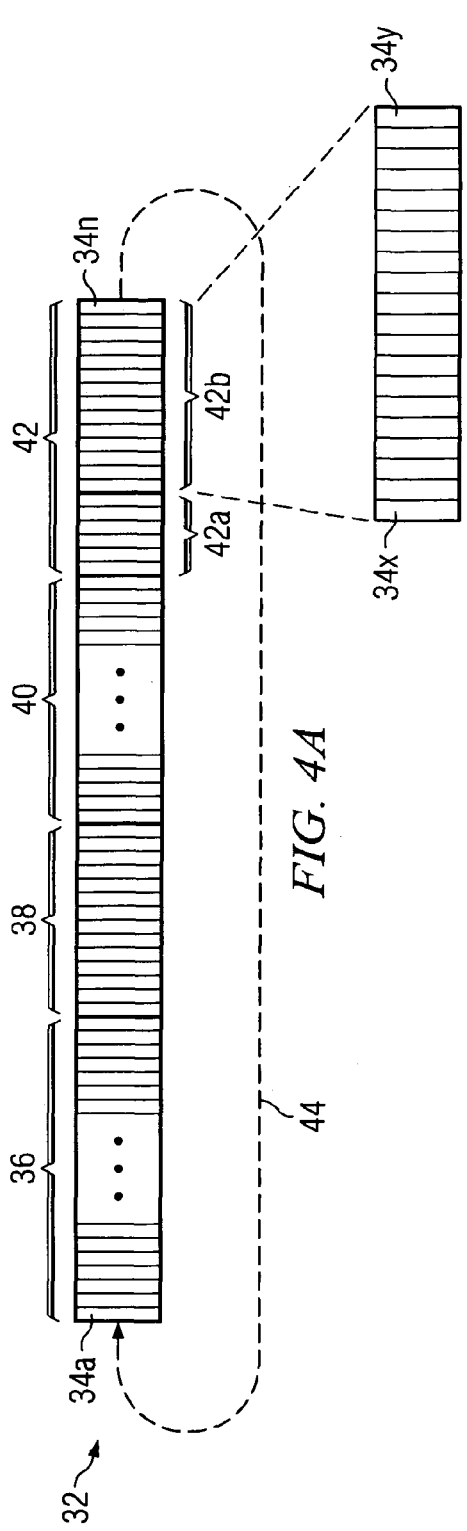
FIGS. 4A and 4B show a circular buffer with an adjustable pointer that determines the wrap around or end point of the buffer.
Figure 4B:
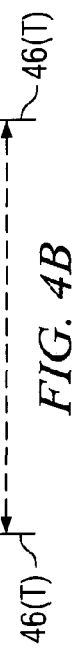

An effective method of expanding or compressing the peak portion of the drive signal between the end point 14a of one cycle and the exact peak or start point 14b of the slow speed drive signal of the next cycle is to generate a table of values representative of a cyclic signal such as for example a sinusoidal cyclic signal as illustrated in FIG. 1A or a repetitive triangular shaped signal as illustrated in FIG. 1C. These values are stored in a circular buffer memory such as buffer 32 illustrated in FIGS. 4A and 4B that are provided at a fixed clock rate to a D/A converter, which in turn provides the drive signal used to position the slow speed mirror. As shown in FIG. 4A, circular buffer 32 includes a multiplicity of storage locations 34a-34n for storing the table of values as discussed above. Further, for purposes of explanation only, buffer 32 illustrates a first group 36 of stored values representing the display portion of the drive signal, a second group 38 representing the bottom or lower peak portion, a third group 40 representing the blanked retrace portion of the drive signal, and a fourth group 42 representing the top or upper peak portion of the drive signal. However, since according to the described embodiment, discussed with respect to FIGS. 3A and 3B, it is necessary to always start at the exact peak 14b of the signal waveform, group 42 of the stored discrete values is illustrated as being divided into portions 42a and 42b. Portions identified by 42a represent a first portion of the top or upper peak portion 42 having a fixed and minimum number of discrete values, and reference number 42b represents discrete values for a second or adjustable portion of the drive signal. As discussed above and as will be appreciated by those skilled in the art, each discrete value is clocked out of the circular buffer 32 in sequence and then as indicated by dashed arrow 44, when the last value (representing end point 14a) of stored group 42 as determined by pointer 46 is clocked out of the buffer, the sequence starts over at the beginning location 34a of the buffer. As shown in FIG. 4B, pointer 46 can be set to any position or data storage location of the buffer between value 34x and 34y. Location 34a is the exact peak value of the drive signal and corresponds to peak or start point 14b of FIGS. 3A and 3B. This peak point adjusting process is continually repeated for each cycle to provide the cyclic drive signal. In a typical circular buffer, the number of stored values will typically be the same or fixed for each cycle. However, to allow the positive transition portion of the cyclic signal, represented by the group 42 of discrete values, to be adjusted by expansion or compression as discussed above and according to the present invention, the top or positive peak portion 42 (or according to an alternate embodiment the bottom peak portion 38) will include a number of discrete values stored in storage locations of the buffer 32 that can be greater than or less than the number required for a nominal drive signal. The extra number (or reduced number) of drive signal points or discrete values allows the timing of the peak 14b of the signal waveform to be adjusted. Thus, the number of discrete values between the end point (as calculated) 14a and the start point 14b of the buffer at "T" is adjusted by positioning the pointer 46 between the extreme left (34x) and the extreme right (34y) locations as indicated in FIG. 4B to include a selected or calculated number of the discrete values necessary to achieve the desired synchronization regardless of whether the timing needs to be increased or decreased.

Simply put, to expand the transition portion of the drive signal, a number of the discrete values that is larger than the number required for a nominal drive signal are included by pointer 46. On the other hand to compress the cycle and the start point 14b, the pointer 46 is moved or adjusted to include a number of the discrete values that is less than that required for a nominal signal. To assure the necessary flexibility of the system, portion 42 of the buffer will always include the number of discrete values required for a minimal allowable complete cycle (indicated at 42a). To this minimum number of discrete values, a sub-group of additional discrete values (42b) are included that will be sufficient to expand the cycle to a level well beyond which would normally be required. Thus, upon receiving the timing or interrupt signal, the number of additional discrete values in sub group 42b required to expand or compress the drive cycle is determined or calculated and the pointer moved to the appropriate location. Therefore, when the buffer outputs the value at the last location as indicated by pointer 46, representative of end point 14a, it then outputs the discrete value at the beginning location 34a of the buffer representing the peak point 14b. Thus, the period for each cycle of the slow speed drive signal is determined and adjusted for each image frame to assure proper positioning of the image on the display screen. It should be appreciated that the circular buffer will typically include a much larger number of discrete value storage locations than show in FIGS. 4A and 4B. Instead of the six locations shown at bracket 42a and the 2D illustrated at bracket 42b. The number of actual storage locations could be several hundred times greater to assure sufficient resolution.

For many applications, if not most, the adjustment discussed above will satisfactorily position the image frame on the display screen. However, for very high quality displays, a further adjustment may be necessary to precisely control the vertical position or first line of the image frame.

More specifically, as was discussed above, an "arming" signal is generated when the slow speed positioning mirror is at a particular position in its back and forth cyclic travel. The "arming" signal is used to vertically position the first scan line of an image frame. Also, as was discussed, a "trigger" signal is generated during each cycle of the high speed mirror to release the image data from a storage buffer and start the display of each scan line at the appropriate horizontal location. If the "phase difference" between the "arming" signal generated by the slow moving mirror and the "trigger" signal generated for the first scan line by the resonant mirror was a constant value, the first scan line would always start at substantially the same vertical and horizontal positions for each image frame. However, since the high sped resonant mirror is not synchronized with the slower speed positioning mirror and is not an exact even multiple of the slower speed positioning mirror, the phase difference between the "arming" signal and the "trigger" signal will likely change for each image frame, which will cause the vertical position of the first scan line of an image frame to vary between two different vertical positions or adjacent scan lines (i.e., vertical positions).

This one scan line variation may be better understood by referring to FIG. 1B. If as an example, line 26a represents the location of the trigger pulse that starts the output or display of data into a scan line and line 26b represents the location of the last bit of a scan line, a frame of image will be displayed on the screen between lines 26a and 26b. In the illustrated example of FIG. 1B, the portion of each drive cycle between lines 26a and 26b indicated by heavy lines represents the portion of the drive signals at which a line of data will be displayed. The portions of the drive signal between lines 26a and 26b that are not shown by heavy lines represent a retrace. Further, if the "arming" signal for an image frame generated by the position of the slow speed mirror occurs on the part of the cyclic drive signal indicated by bracket 47a or before, the first scan line will be displayed between lines 26a and 26b of the high speed drive signal as indicated by double headed arrow 48a. However, if the "arming" signal occurs at any point on the drive signal after point 49a that means the circuit was not armed at the time of the trigger signal at line or point 49a. Therefore, the unarmed "trigger" signal can not operate to release the data from the storage buffer so that the first scan line can be displayed. This means that the display of the first line of data must wait until the next "trigger" signal occurs, as is indicated at 49b. Consequently, the first line of an image will be displayed on the heavy portion of the cyclic drive signal as indicated by the double headed arrow 48b. In the embodiment shown, the heavy line portion 48b is one display or scan line away from heavy line portion 48a. As discussed above, the location of the "arming" signal with respect to the "trigger" signal will continuously vary since the high speed signal is not an exact even multiple of the low speed signal and therefore, without compensation, the first line of display of an image frame will vary or jitter between the first two top scan lines as indicated by double headed arrows 48a and 48b. The location difference between the occurrence of the arming and trigger signals is referred to as the phase difference.

This jitter problem is solved according to the present invention by maintaining the phase difference at a constant value. This approach is effective since a constant value for the phase difference means the "arming" signal will always occur at substantially the same position on the high speed drive cycle or at the same phase difference as was discussed above with respect to FIGS. 4A and 4B. Consequently, the first line of data will always be at substantially the same vertical position.

Therefore, according to a first embodiment of the invention, since the speed of both mirrors is known, and since the movement or position of both mirrors can be precisely determined at a specific time, the phase difference can be maintained as a constant by adding or removing a calculated number of the storage locations in the same manner as discussed above with respect to FIGS. 3A and 3B. However, the number of storage locations or discrete values added or subtracted to fine adjust and maintain the phase difference as a constant will typically be significantly less than the number discussed above for synchronizing the incoming data stream with the low frequency positioning mirror.

It is also important to note that adjusting (expanding or compressing) the peak portions of the cyclic slow speed drive signal is shown as being accomplished in the upper peak portions of the drive signal (the portion above line 22), while the video signal is blanked or cut off. It should also be appreciated that although FIGS. 3A and 3B illustrate the adjustment as taking place in the upper or positive peak portions, similar effective adjustments could be made in the lower peak portion (i.e. portions below line 24). Alternately, a portion of the required adjustment could take place in the upper peak portions and another portion in the lower peak portions. The above described embodiment is believed to be an effective and suitable technique for maintaining the phase difference if the discrete values or samples that generate the cycle are provided at a sufficiently high clock rate. However, if a slow delivery or clock rate of the discrete value is used, the resolution may be too low.

More specifically and referring again to equations 1) and 2) above, it will be appreciated that the equations assume a constant clock rate or sample-time $T_s$ for delivering the discrete values. Therefore, as an example, if $T_s=10$ microseconds, then the time between two consecutive samples of the discrete values (e.g., y(1) and y(2)) would be 10 microseconds. Thus, if the image pixel delivery or clock rate is 20 MHz, then 200 image pixels will be provided to the scan cycle for every discrete value of the drive cycle. It will be appreciated that adding or dropping a drive cycle discrete value simply would not provide sufficient resolution to maintain the necessary phase difference.

Therefore, a second embodiment for maintaining or adjusting the phase difference between the arming signal and the trigger signal is to slightly modify the sample time $T_s$ or clock rate at which a selected number of the cycle drive discrete samples are delivered. As an example only, $T_s$ may be modified from 10 microseconds (µ) to 10.3 microseconds (µ) for a selected number of discrete values in the peak portion of the cycle and the nominal Ts would then be restored before the display portion of the cycle. This approach provides significantly improved resolution for maintaining the selected phase difference.

It should also be appreciated that although the above detailed discussion has been with respect to a "sinusoidal" slow speed drive signal, such as shown in FIG. 1A, the discussion is equally applicable to the repetitive "triangular shaped" drive signal such as illustrated in FIG. 1C. In addition, in the embodiments shown, the appropriate adjustment could also occur during the return or travel of the drive signal back to the start point (i.e. between points 20 and 14). However, to increase brightness, other embodiments of mirror display systems may provide an image frame during the return or retrace portion of the slow speed signal as well as the display portion so that the adjustment steps are preferably limited to the upper and lower peak portions as discussed above.

Figure 5A:
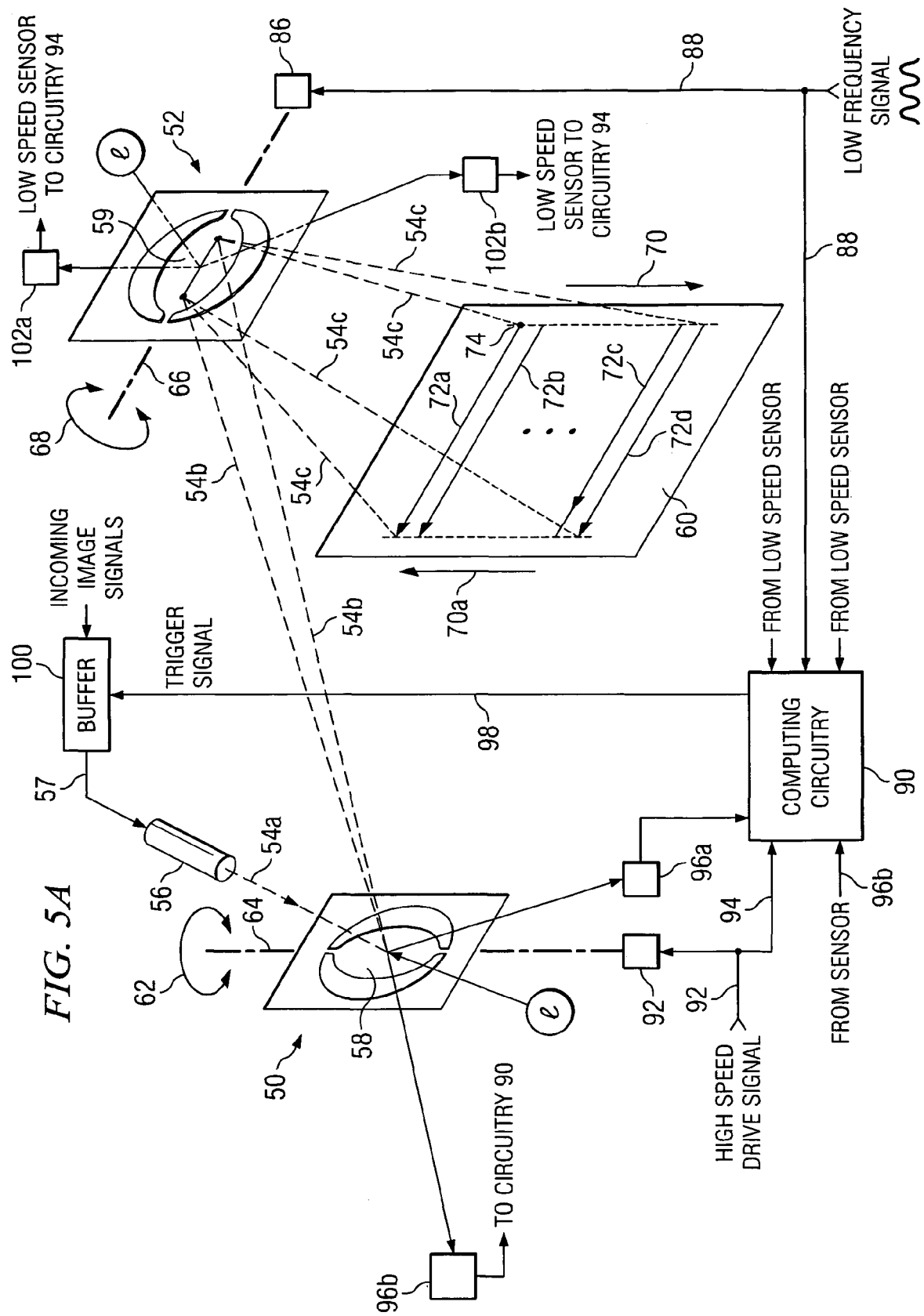
FIGS. 5A and 5B are simplified diagrams illustrating a torsional hinged mirror display system using two single axis mirrors.

Referring now to FIG. 5A, there is a perspective illustration of an embodiment of the present invention as used in a visual display that uses two separate single axis mirrors, such as discussed above, that pivot about their torsional hinges. As shown, a high frequency or scanning single axis torsional hinged mirror 50 may be used in combination with a low frequency or positioning single axis torsional hinged mirror 52 to provide a raster scan. A light beam 54a from a source 56 is modulated by incoming signals on line 57 to generate pixels that comprise the scan lines. The modulated light beam 54a impinges on the high frequency resonant mirror 50 and is reflected from surface 58 as sweeping light beam 54b to the reflecting surface 59 of the low frequency positioning mirror 52. Positioning mirror 52 redirects the modulated light beam 54c to a display surface 60, which may be a screen or other light sensitive medium. The oscillations of the high frequency scanning mirror 50 (as indicated by arcuate arrow 62) around pivot axis 64 results in light beam 54c (the scan lines) sweeping across the surface 60, whereas the oscillation of the positioning mirror 52 about axis 66 (as indicated by double headed arrow 68) results in the scan lines being positioned vertically (or orthogonally to the scan lines) on the display surface 60. It is again noted that the terms horizontal and vertical are for explanation purposes only. Therefore, since the scanning motion of light beam across display surface 60 may occur several hundred or even a thousand times during the orthogonal movement in one direction of the low speed positioning mirror 52, as indicated by arrow 70, a raster scan type image can be generated on display surface 60 as indicated by image lines 72a, 72b, 72c, and 72d. According to another embodiment, the light beam 54c may also be used to paint another image in the reverse direction as indicated by arrow 70a. To do this, the mirror travels back to the starting point 74 and then starts over.

Figure 5B:
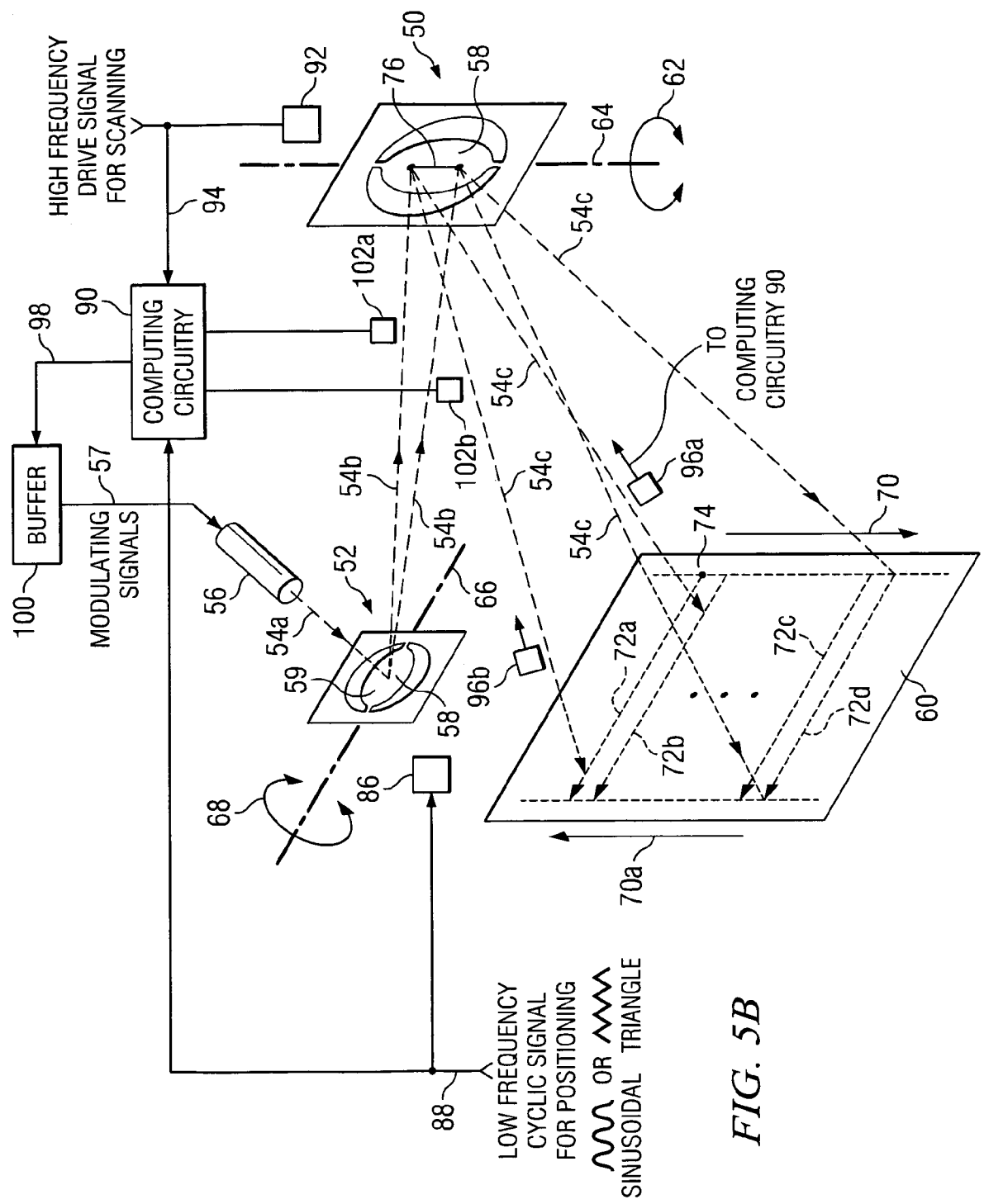

Referring to FIG. 5B, there is another perspective illustration of an embodiment of the present invention using two separate single axis mirrors that pivot about their torsional hinges. As shown, a high frequency or scanning single axis torsional hinged mirror 50 may be used in combination with a low frequency or positioning single axis torsional hinged mirror 52 to provide a raster scan type visual display. A light beam 54a from a source 56 is modulated by incoming video signals and impinges on the low frequency positioning mirror 52. The modulated light beam 54b is then reflected off of mirror surface 59 to reflecting surface 58 of the high frequency oscillation or scanning mirror 50, which redirects the modulated light beam 54c to display screen or surface 60. The oscillations (as indicated by arcuate arrow 62) of the scanning mirror 50 about axis 64 results in light beam 54c sweeping across display screen 60.

It will also be appreciated that oscillations of the positioning mirror 52 about axis 66 as indicated by double headed arcuate arrow 68 will move the reflected modulated light beam 54b with respect to scanning mirror 50 such that the light beam 54b moves orthogonally to the scanning motion of the light beam as indicated by line 76 in the middle of reflecting surface 58. Thus, it will be appreciated that since the high frequency scanning motion of the light beam 54c as indicated by image lines 72a, 72b, 72c, and 72d on display screen 60 occurs several hundred or even a thousand times during a single orthogonal movement of the low frequency positioning mirror, a raster scan type visual display can be generated or painted on display screen 60 as indicated by arrow 70. The light beam 54c then returns or travels back to the starting point 74 as indicated by arrow 70a.

Figure 5C:
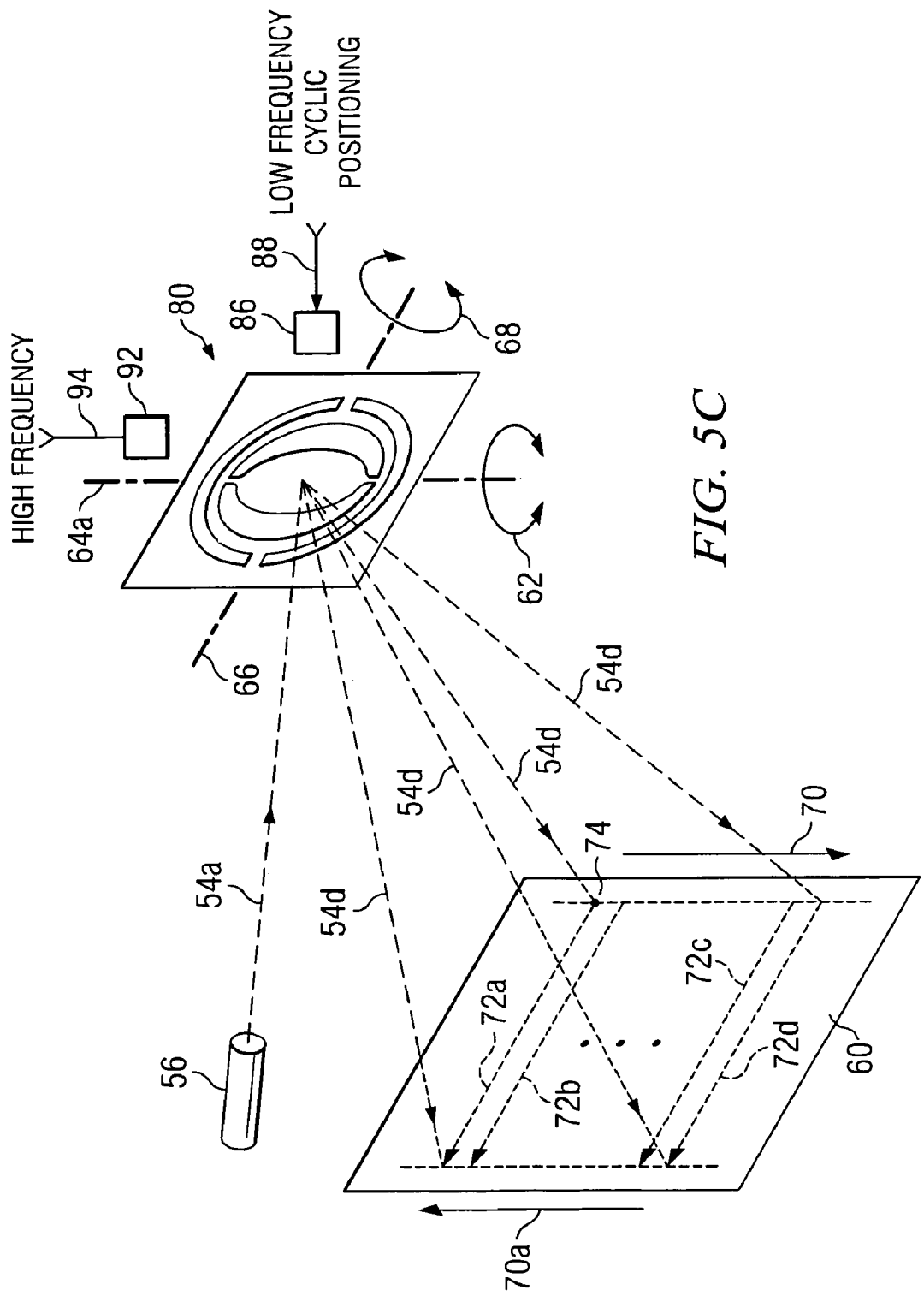
FIG. 5C is a simplified diagram illustrating another embodiment comprising a single dual axis mirror that replaces the two single axis mirrors.

The above discussion is based on two single axis torsional hinged mirrors. However, as will be appreciated by those skilled in the art, a single dual axis torsional hinged mirror, such as mirror structure 80 shown in FIG. 5C may used to provide both the high frequency scanning motion about axis 64a as indicated by arcuate arrow 62, and the positioning or orthogonal motion about axis 66, in the same manner as the oscillation of the individual mirrors 50 and 52 discussed in the embodiment of FIGS. 5A and 5B. The remaining elements of FIG. 5C operate the same as in FIGS. 5A and 5B and consequently carry the same reference number. It should also be noted, however, that the modulated light beam 54a is only reflected one time and, therefore, the reflected beam carries reference number 54d.

As was discussed above, the illustrated embodiments relate primarily to synchronization of the incoming stream of video data signals with the motion of the slow speed positioning mirror. In addition, the synchronization of the flow of (a scan line of) data signals with respect to the actual position of the resonant mirror as determined by sensors and a feedback circuit was briefly discussed. As was also discussed above, a "trigger" signal is generated to initiate the release of a data stream from a buffer so that the image pixels are precisely positioned or distributed across the beam sweep.

As will also be appreciated by those skilled in the art, according to another embodiment, the motion and corresponding position of the low frequency positioning mirror can be determined and/or reasonably predicted or calculated for any selected instant in time from the actual signals used to drive, the low frequency mirror about its respective axis. Further, for most embodiments, the low frequency mirror operates satisfactorily without the use of external sensors to provide feedback of the actual position of the low frequency mirror. Therefore, referring again to FIGS. 5A, 5B, and 5C as shown, there is a drive mechanism 86 for positioning the low speed mirror 52 in response to a low frequency cyclic signal such as illustrated in FIGS. 1A and 1B and which is received on input line 88. This low frequency cyclic drive signal is also provided to computing circuitry 90 and, as discussed above, may be used to determine or estimate the position of mirror 52.

Similarly, there is included a high speed drive mechanism 92 responsive to high frequency signals on input line 94 for driving the high speed mirror at its resonant frequency. The high frequency drive signals are also provided to computing circuitry 90. However, it should be noted, that the position of the high speed resonant mirror 50 cannot accurately be determined or inferred from the drive signal, and consequently, as discussed above, an external sensor 96a (or sensors 96a and 96b) along with a feedback circuitry connected to computing circuitry 90 is required to determine the position of the high speed resonant mirror. Then, as shown, the "trigger" signal is calculated and provided on line 98 to buffer 100 to initiate the release or distribution of the data stream for each scan line.

FIGS. 5A and 5B also illustrate that sensors 102a and 102b may be included to monitor the actual position of the low frequency mirror, just as sensors 96a and 96b were used to monitor the actual position of the high speed mirror. However, as was also mentioned, for most applications, it is not necessary to include such sensors for the low speed mirrors.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the structure or methods and steps described in the specification. As one of ordinary skill in the art will readily appreciate from the disclosure of the present invention, structure, methods, or steps, presently existing or later to be developed, that perform substantially the same function or achieve substantially the same result as the corresponding embodiments described herein may be utilized according to the present invention. Accordingly, the appended claims are intended to include within their scope such structures, methods, or steps.

What is claimed is:

1. In a video display system comprising a high speed scanning mirror for generating scan lines of a frame of video and a low frequency oscillating mirror for orthogonally positioning said scan lines, a method of preventing variations in the position of a first scan line of an image frame comprising the steps of:
   generating a cyclic drive signal to oscillate said low frequency mirror; said cyclic drive signal defining peak portions;
   synchronizing frames of incoming video signals for display with the oscillation of said low frequency positioning mirror;
   determining a phase difference between the movement of the sweep of said high speed resonant mirror that displays a first image line and said slow speed mirror; and
   adjusting said phase difference to be a constant such that the first scan line of each image frame starts at the same vertical location.

2. The method of claim 1 wherein said step of adjusting said phase difference comprises the step of expanding or compressing a portion of said cyclic drive signal.

3. The method of claim 1 wherein said step of generating said cyclic drive signal comprises the step of generating either a substantially sinusoidal shaped drive signal or a repetitive substantially triangular shaped drive signal.

4. The method of claim 2 wherein said step of generating said cyclic drive signal comprises the step of generating a series of discrete values representative of at least one cycle of said cyclic drive signal.

5. The method of claim 4 wherein said step of expanding or compressing a portion of said cyclic drive signal comprises increasing the number of discrete values available for positioning said low frequency mirror to expand said one of said upper and lower peak portions of said cyclic drive signal or decreasing the number of discrete values available for positioning said low frequency mirror to compress said one of said upper and lower peak portion of said cyclic drive signal.

6. The method of claim 4 wherein said step of adjusting said phase difference comprises the step of generating discrete values representative of a drive cycle;
   storing said discrete values in a circular buffer; and
   positioning a pointer of said circular buffer to add or remove selected ones of said discrete values to adjust said phase difference to a constant value.

7. The method of claim 6 wherein the pointer adjusts the point in the buffer where the circular buffer wraps back to the start location.

8. The method of claim 4 wherein said step of expanding or compressing a portion of said cyclic drive signal comprises modifying the clock rate for a selected number of the cyclic drive discrete values.

9. The method of claim 1 further comprising providing sensors to monitor the actual position of said low frequency mirror.

10. The method of claim 1 further comprising storing or buffering data signals for each scan line, generating an arming signal when said low frequency mirror is at a selected position, generating a trigger signal each time said high speed scanning mirror is at a selected scan position, and initiating the delivery of said buffered data signals for each scan line by said trigger signal.

11. The method of claim 10 further comprising the step of sensing the actual position of said scanning mirror and generating said trigger signal from said sensed positions.

12. The method of claim 1 wherein said step of synchronizing further comprises receiving said frames of incoming video signals, each said frame including a timing signal and prior to said step of adjusting said phase difference adjusting a portion of said cyclic drive signal to synchronizing said timing signal of each incoming frame of video signals with said cyclic drive signal.

13. The method of claim 12 wherein the period of said received frames of incoming video signals varies.

14. The method of claim 1 wherein each said frame of incoming video signal has a first line of pixels, and said display portion of said drive signal defines a pixel start location, and wherein said step of adjusting said peak portion of said cyclic drive signal synchronizes said pixel start location with said first line of pixels of said frame of video.

15. The method of claim 1 further comprising:
   providing a drive signal to oscillate said scanning mirror at a known frequency;
   storing a multiplicity of image signals, in a buffer, said multiplicity of signals representing pixels comprising at least one of said plurality of scan lines;
   determining when said oscillating scanning mirror passes a predetermined location;
   calculating the timing of a trigger signal in response to said known frequency and said oscillating mirror passing said predetermined location; and providing said trigger signal to initiate the release of said stored multiplicity of image signals to generate said scan lines.

16. The imaging system of claim 15 wherein said drive signal oscillates said scanning mirror at substantially its resonant frequency.

17. The imaging system of claim 15 further comprising at least one sensor for determining when said oscillating mirror passes said predetermined location.

18. In an imaging system comprising a high speed resonant scanning mirror for generating a plurality of scan lines to form an image frame, and a low frequency mirror for orthogonally positioning said scan lines, a method of synchronizing said low frequency mirror with frames of incoming imaging signals, and synchronizing said imaging signals with said resonant scanning mirror comprising the steps of:
generating a cyclic drive signal to position said low frequency mirror along a path defining upper and lower peak portions and a display portion;
receiving said frames of incoming imaging signals for being displayed, each said frame including a timing signal;
adjusting one of said portions of said cyclic drive signal to synchronize said cyclic drive signal with said timing signal of each incoming frame of said imaging signals;
generating an arming signal for starting an image frame;
providing a drive signal to oscillate said scanning mirror at its known resonant frequency;
sequentially storing a multiplicity of said imaging signals in a buffer, said sequentially stored multiplicity of signals representing pixels comprising each of said plurality of scan lines comprising said image frame;
determining when said oscillating scanning mirror passes a predetermined location;
calculating the timing of "trigger" signals in response to said known frequency and said resonant mirrors passing said predetermined location;
determining the phase difference between the movement of the sweep of said high speed resonant mirror that displays the first image line and said low frequency mirror;
adjusting said phase difference to be a constant; and
releasing said stored multiplicity of image signals in response to said trigger signals to generate said plurality of scan lines such that the first scan line of each image frame starts at the same vertical position.

19. The method of claim 18 wherein said step of adjusting said phase differences comprises further adjusting a portion of said cyclic drive signal in addition to said adjustment for synchronizing said cyclic drive signal with said incoming frame of said imaging signals.

20. The method of claim 18 wherein said step of adjusting said cyclic drive signal to synchronize with said incoming frames of said imaging signals comprises adjusting one of said upper and lower peak portion, and wherein said step of adjusting said phase difference to be a constant comprises adjusting the other one of said upper and lower peak portions.

21. The method of claim 18 wherein said step of generating said cyclic drive signal comprises the step of generating a series of discrete values representative of at least one cycle of said cyclic drive signal.

22. The method of claim 21 wherein said step of expanding or compressing a portion of said cyclic drive signal comprises increasing the number of discrete values available for positioning said low frequency mirror to expand said one of said upper and lower peak portions of said cyclic drive signal or decreasing the number of discrete values available for positioning said low frequency mirror to compress one of said upper and lower peak portion of said cyclic drive signal.

23. The method of claim 21 wherein said step of expanding or compressing a portion of said cyclic drive signal comprises modifying the clock rate for a selected number of the cyclic drive discrete values.

* * * * *